March 5, 1935.  P. G. HÖRNELL  1,993,666
CONTROL AND AUTOMATIC CUT-OFF VALVE
Filed April 12, 1933
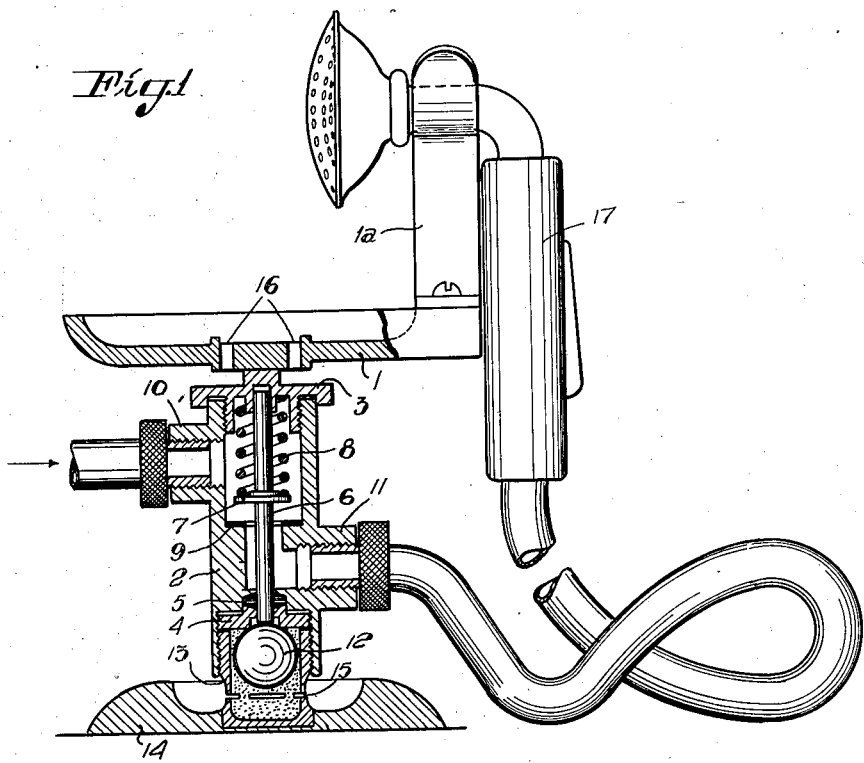
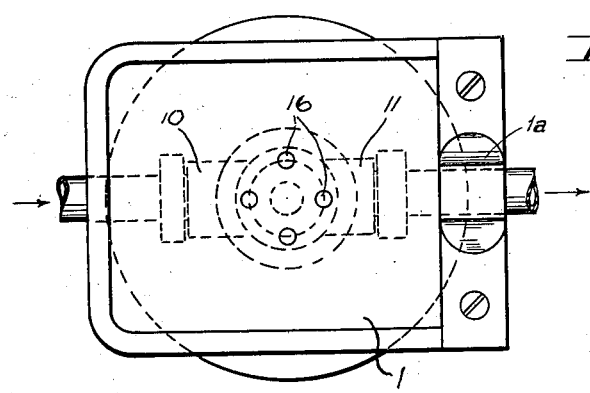

Patented Mar. 5, 1935

1,993,666

UNITED STATES PATENT OFFICE 1,993,666

CONTROL AND AUTOMATIC CUT-OFF VALVE

Per Gustaf Hörnell, Lidingo, Sweden

Application April 12, 1933, Serial No. 665,802
In Sweden April 14, 1932

8 Claims. (Cl. 251—114)

There are a number of arrangements for the use of water in dwelling houses, factories and the like which suffer from the drawback that a fault in these arrangements may cause great devastation if the conduits supplying the water are not cut off as soon as the fault develops. For example, it frequently occurs that the floors and floorings of dwelling houses become ruined through pipe-breaks and similar break-downs, particularly when these occur in the night-time or when the dwellings are uninhabited.

If the present invention, which relates to a valve in a fluid-conveying system generally, is used in a water-pipe system, it will have the effect that the supply of water to the system is automatically interrupted as soon as a breakdown, such as a pipe-break, occurs or threatens to occur.

It also happens that the quantity of water required per unit of time for a certain purpose must be independent of the water-pipe pressure in that building where the apparatus or implement, with the aid of which the water is utilized, is mounted. The arrangement according to the invention answers this requirement too, inasmuch as the same can also be used as a control valve.

Finally, the arrangement can also be used for a complete cut-off of the water supply or the like to the system without any previous breakdown having occurred.

The valve according to the invention is principally characterized by a body or mass of material adapted to control the operation of the valve and having the property that in contact with the fluid in question it is subjected to a mechanical or chemical change particularly with respect to the strength thereof, such as melting, dissolution, softening, disintegration, a hygroscopic change or the like. The valve is preferably arranged at or in the proximity of the place where the fluid is introduced into the system. At normal functioning of the fluid-conveying system, the body or mass adapted to control the valve should be protected against contact with the fluid in question.

The invention will be described more fully in the following with reference to the accompanying drawing, in which Fig. 1 shows a section of a valve according to the invention, while Fig. 2 is a plan view thereof.

Here, the arrangement is conceived as being combined with a shower-bath spray device or other water consuming apparatus secured to a flexible tube, by means of which apparatus the spray device or the like may be directed as desired owing to the flexibility of the tube. A bowl-shaped vessel 1, in or in the proximity of which the hand-douche or the like is intended to lie when not in use is secured to the wall or other appropriate supporting structure. Underneath the bowl is secured a valve according to the invention. This valve consists of the valve-casing 2 with a cover 3 and a packing gland 4 screwed therein. Arranged within the packing gland 4 and the valve casing is a packing 5 having the valve spindle 6 extending therethrough. This valve spindle is provided with a disk 7 actuated by a spring or other elastic or resilient member 8 tending to press the disk 7 to bear on a seat provided with a packing 9. The water is supplied to the valve through the inlet 10 and escapes, when the valve is open, through the outlet 11 which is connected to a flexible tube, and which opens, for instance, in a hand-douche 17 which may be suspended in a holder, a peg or the like 1a connected with the bowl-shaped vessel 1. The valve disk 7 may be adjusted towards and from the valve seat or packing 9 by control mechanism which is threaded into the valve casing 2 and which, in the illustrated embodiment of the invention, serves as the base on which the casing is supported. The control mechanism includes a ball 12 for engagement with the valve spindle 6, the ball being supported within the threaded sleeve 13 by a body or mass of material which normally provides a rigid support for the ball but which loses its rigidity or supporting power when contacted by the fluid, usually water, of the conduit. The body or mass, in the embodiment described, consists of powdered sugar but may consist of some other disintegrated material of a suitable kind in the form of pieces, grains or powder. The lower or outer end of the threaded sleeve is rigidly secured to a flange ring 14, the lower face of the flange ring being flat to provide a support for the valve assembly when placed on a level surface and the upper face of the flange ring having upwardly bent edges, so that the flange ring forms a bowl intended to receive leaking water. The wall of the sleeve-shaped part 13 is provided with small openings or slits 15 located underneath the level of the upper edges of the flange bowl. Before the valve parts are screwed together, the space defined by the sleeve wall 13 is filled with powdered sugar to a suitable level, whereupon the ball 12, which preferably consists of metal, is inserted. When the said sleeve is screwed into the valve casing by rotation of the flange portion 14, the ball will first strike against the lower end of the spindle 6 and will, upon further rotation of the flange portion 14, raise the valve spindle and the disk 7 attached thereto, against the action of the spring 8, so that the said disk is removed from the seat 9. The powdered sugar in the sleeve 13 is compressed to a degree corresponding to the tension of the spring 8. The valve is now open and permits the supply of water from the inlet 10 through the interior of the valve and out through the outlet 11, and further to the consuming implement. As stated, this implement rests in or above the bowl 1 when out of use.

According to a preferred embodiment the connection between the tube and the valve casing 2 as well as the whole length of the tube together with the implement attached thereto is disposed above the bowl so that leakage water, if any, issuing from the joint between the tube and the casing, from any point of the tube or from the implement is directly collected by the perforated vessel 1 or follows the tube to be collected in bowl 14. The tube may be wound or covered with fabric or other material promoting the adhesion of leak water to the exterior of said tube all the way down to bowl 14.

The water which collects in the bowl-shaped vessel 1 escapes at once through the holes 16, flowing down the exterior of the valve casing and finally reaching the flange bowl 14. From the latter, the water penetrates through the slits 15 to the mass of powdered sugar, which with respect to its resistivity is exceedingly sensitive to moisture. The sugar which is thus moistened no longer offers sufficient resistance to the latent energy accumulated in the spring 8 through the compression thereof, but yields to the tension of the spring which presses the disk 7 to bear on the seat 9, the supply of liquid to the outlet 11 and the consuming apparatus connected thereto being thus cut off. It has been found that exceedingly small quantities of water are required to influence the sugar in this manner. If a tube break or other break-down resulting in non-desirable escape of water has occurred and the valve has been closed automatically in the manner explained hereinbefore, no difficulty will be experienced afterwards in opening the valve again. The parts 13 and 14 are unscrewed, the moistened mass of sugar is removed, the parts are carefully dried, another quantity of sugar is filled in, the ball 12 is inserted in its place, and the whole is screwed into the valve casing in the manner hereinbefore described, so that the valve disk is raised from its seat and the valve is opened. It is obvious that the arranging of the body or mass sensitive toward the fluid in a safety valve may be effected in a number of other ways than those described. The condition for this is only that the body or mass is subjected to a change of state, particularly with respect to the strength thereof, and that it will then release a valve member as soon as the body or mass has been brought into contact with the fluid expected to leak out. For example, the powdered sugar in the embodiment described may be replaced by a lump of sugar, in which case the ball 12 may be omitted, in that the lump of sugar acts directly on the lower end of the valve spindle.

It is evident that the arrangement according to the invention may also be used as a control valve. In such cases, for instance, where the quantity of water required in the consuming apparatus per unit of time must be independent of the pressure in the water-pipe system, no difficulties are encountered in varying the distance between the disk 7 and its seat, and thus the quantity of water flowing through the device, by screwing the sleeve 13 in or out.

Hereinbefore, the valve has been described in connection with a water-conveying system. It should be understood, however, that it can be used in systems traversed by any fluids, such as gases or vapors or liquids other than water. The main point is only that the body or mass acting against the power of the valve spring, or of some other elastic valve member, has the property of being subjected to a change of state when contacting with the fluid in question, such as melting, softening or dissolution, so that its power of resistance to the tensioned valve spring or the like is destroyed through the action of the fluid, whereby the valve is thus caused to cut off the supply of fluid when a break or the like occurs in the conduit. It will be obvious that the preferred construction will provide, by a suitable location of the device and by the arrangement of collecting contrivances, such as funnels, bowls, or the like, that even minimum quantities of leaking fluid will be quickly brought into contact with the sensitive body or mass.

What I claim is:—

1. In a control and automatic valve for use in a fluid conduit, the combination with a valve casing having a passage therethrough, a valve adjustable between full open and closed positions to control fluid flow through the passage, and means yieldingly urging said valve towards one of said positions, of control means for normally retaining said valve in a desired position of adjustment; said control means comprising control mechanism including a mass of material having normal rigidity but subject to attack with accompanying loss of rigidity by the fluid in question, and a member housing said mass of material, said member being provided with openings through which leakage fluid may enter said member to contact said mass of material.

2. In a control valve of the type stated, a casing having a fluid passage therethrough, a valve in said passage and means normally urging the same towards closed position, and means adjustable to hold said valve in any desired position of adjustment; said adjustable means including a mass of normally rigid material which is subject to attack with accompanying loss of rigidity by the fluid which is to be controlled, and a perforated member housing said mass of material, the perforations of said member constituting a path by which leakage fluid may reach said material.

3. In a control valve of the type stated, a casing having a fluid passage therethrough, a valve in said passage and seating in the direction of fluid flow, control mechanism adjustable with respect to said casing to force said valve to open position, and means on said casing normally preventing fluid within said passage from contacting said control mechanism; said control mechanism including an apertured member adjustable towards and from said valve, and a normally rigid mass of material within said member for transmitting pressure to said valve, said normally rigid means being subject to attack with accompanying loss of rigidity when contacted by leakage fluid entering said member through the apertures thereof.

4. In a system for controlling the flow of fluid through a conduit, a valve device adapted to limit the maximum flow through said conduit and operable automatically to closed position upon leakage of fluid, said valve device comprising a casing having a fluid passage therethrough, a valve spring pressed towards closed position, a hollow member adjustable towards and from said valve, and a mass of normally rigid material within said member for transmitting movement thereof to said valve, the wall of said hollow member having openings therethrough to admit leakage fluid to the interior thereof, said material being attacked by the leakage fluid with accompanying decrease in rigidity to permit said spring pressed valve to close, irrespective of the adjustment of said hollow member.

5. A valve device as claimed in claim 4, wherein said hollow member extends below said valve casing, in combination with a flanged ring secured to the lower end of said hollow member and forming a basin for the collection of leakage fluid, the upper rim of said flanged ring extending above the openings in said hollow member.

6. A valve device as claimed in claim 4, wherein said valve includes a stem, in combination with a rigid member engaging said stem and normally supported within said hollow member by said mass of material.

7. A valve device as claimed in claim 4, wherein said mass of normally rigid material consists of powdered sugar.

8. In a control valve, a casing having a fluid passage therethrough, a valve having a valve stem vertically slidable in said casing, a spring for urging said valve towards closed position, a hollow valve operator threaded into the lower portion of said casing, an upwardly flanged ring forming a basin at the lower end of said valve operator, and a mass of water-soluble particles compressed within said hollow operator to transmit the motion thereof to said valve stem, said hollow operator being provided with openings through which leakage water collecting in said basin may pass to the interior of said hollow operator.

PER GUSTAF HÖRNELL.